(12) United States Patent
Benkert et al.

(10) Patent No.: US 9,328,766 B2
(45) Date of Patent: May 3, 2016

(54) ROLLING BEARING HAVING AN INTEGRATED GENERATOR AND METHOD FOR THE ENERGY MANAGEMENT OF A ROLLING BEARING OF SAID TYPE

(75) Inventors: Frank Benkert, Waigolshausen (DE); Thomas Rink, Waldfenster (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 510 days.

(21) Appl. No.: 13/698,440

(22) PCT Filed: May 9, 2011

(86) PCT No.: PCT/EP2011/057383
§ 371 (c)(1),
(2), (4) Date: Nov. 16, 2012

(87) PCT Pub. No.: WO2011/144475
PCT Pub. Date: Nov. 24, 2011

(65) Prior Publication Data
US 2013/0057118 A1   Mar. 7, 2013

(30) Foreign Application Priority Data

May 21, 2010   (DE) .......................... 10 2010 021 158

(51) Int. Cl.
| | |
|---|---|
| H02K 7/08 | (2006.01) |
| F16C 19/00 | (2006.01) |
| F16C 41/00 | (2006.01) |
| G01P 3/44 | (2006.01) |
| G01P 3/487 | (2006.01) |
| H02K 7/18 | (2006.01) |

(52) U.S. Cl.
CPC ............... *F16C 19/00* (2013.01); *F16C 41/004* (2013.01); *F16C 41/007* (2013.01); *G01P 3/443* (2013.01); *G01P 3/487* (2013.01); *H02K 7/1846* (2013.01)

(58) Field of Classification Search
None
See application file for complete search history.

(56) References Cited

U.S. PATENT DOCUMENTS

| | | | | | |
|---|---|---|---|---|---|
| 4,972,332 | A | * | 11/1990 | Luebbering | ............. G01P 13/04 324/166 |
| 6,222,359 | B1 | * | 4/2001 | Duesler | .................. G01D 5/145 324/207.12 |
| 6,992,478 | B2 | * | 1/2006 | Etherington | ........... G01D 5/145 324/207.2 |
| 7,362,023 | B2 | * | 4/2008 | Mizutani | ................. F16C 33/78 310/90 |

(Continued)

FOREIGN PATENT DOCUMENTS

| | | |
|---|---|---|
| CN | 1495048 | 5/2004 |
| CN | 1985150 | 6/2007 |
| DE | 2505802 | 8/1976 |
| DE | 19512512 | 11/1995 |
| DE | 69524014 | 11/2001 |
| DE | 102008035717 | 2/2010 |

(Continued)

*Primary Examiner* — Tran Nguyen
(74) *Attorney, Agent, or Firm* — Volpe and Koenig, P.C.

(57) ABSTRACT

A rolling bearing having a permanently excited first generator (09) which is arranged in an intermediate space between two bearing rings which are rotatable relative to one another, the first generator having a primary part and a secondary part and generating a first generator voltage when it operates, the secondary part has permanent magnets (04) which are arranged with alternating polarity on the circumference of one of the bearing rings at least in sections. The rolling bearing includes a second generator (21), and the first generator voltage serves for the supply of energy to a sensor arrangement and/or actuator arrangement integrated in the bearing, whereas the second generator outputs a voltage signal for position determination and rotational speed measurement. A method for the energy management of a rolling bearing of this type is also provided.

4 Claims, 3 Drawing Sheets

(56) References Cited

U.S. PATENT DOCUMENTS

| | | |
|---|---|---|
| 7,667,455 B2 | 2/2010 | Sugiyama et al. |
| 2005/0174001 A1 | 8/2005 | Mizutani et al. |
| 2010/0141244 A1* | 6/2010 | Bartos .................. G01D 5/12 324/207.21 |
| 2010/0289487 A1 | 11/2010 | Mizuta |
| 2011/0043193 A1* | 2/2011 | Aebi .................... G01D 5/145 324/207.2 |

FOREIGN PATENT DOCUMENTS

| | | |
|---|---|---|
| EP | 0402240 | 6/1990 |
| EP | 0397309 | 11/1990 |
| EP | 0594550 | 4/1994 |
| EP | 2116813 | 11/2009 |
| JP | 2004132447 | 4/2004 |
| JP | 2008174067 | 7/2008 |
| WO | 2008014766 | 2/2008 |

* cited by examiner

ROLLING BEARING HAVING AN INTEGRATED GENERATOR AND METHOD FOR THE ENERGY MANAGEMENT OF A ROLLING BEARING OF SAID TYPE

FIELD OF THE INVENTION

The invention relates to a rolling bearing with a permanently excited first generator that is arranged in the intermediate space between two bearing rings that can rotate relative to each other. The invention further relates to a method for the energy management of a rolling bearing equipped with a generator.

Rotational rolling bearings comprise bearing parts that can move and rotate relative to each other, an inner ring and an outer ring, and rolling bodies that are arranged in between these rings. Different bearing applications require, for example, the detection of the rotational speed and rotational direction or other monitoring tasks of the rotating bearing part. For this and other tasks, electronic components (sensors, actuators, processors, data memories, etc.) are used. These electronic components must be supplied with energy. A few solutions are known here from the prior art.

BACKGROUND

WO 2008/014766 A1 describes a device for monitoring at least one operating parameter of a wheel set bearing of a rail vehicle. The device comprises a sensor and a transmitting unit that are arranged with the bearing ring rotating on the end of the wheel axle and a generator unit with a co-rotating and a rotationally locked generator element for supplying energy to the sensor and transmitting unit. The co-rotating generator element is a Wiegand element that is arranged on the end of the wheel axle, while the second cooperating generator element is formed by magnets that are fixed in location. This device cannot be integrated directly into the bearing.

In EP 0 397 309 A2, a bearing arrangement is described in which a rotational speed sensor is integrated. In a two-row rolling bearing, a pole wheel is mounted on the rotating inner ring between the two rows of rolling bodies. The pole wheel is formed on its periphery by a magnetic ring with alternately arranged poles of the magnets. A Hall sensor is provided in the outer ring in the radial orientation relative to the pole wheel. The pole wheel can also be constructed from a ferromagnetic material with extended poles (e.g., teeth). Then a magnet is required in the sensor arrangement. Because the sensor is provided on the stationary bearing part, supplying it with energy is not problematic.

From DE 695 24 014 T2, a wheel bearing of a rail vehicle with an integrated rotary current generator is known. The energy generated by the generator is stored in a battery. The generator is arranged in the inner space between the two conical rollers and comprises a rotor that rotates with the inner ring and the axle and a stator that is fixed in place on the outer ring. The rotor comprises a row of permanent magnets that are arranged at equal distances on the ring area between the conical rollers in the peripheral direction. The poles of the permanent magnets are arranged radially and distributed around the ring with alternating polarity. As a whole, the stator is a sheet metal packet made from magnetic steel films with extended teeth each of which carries a wound coil. The three-phase stator winding is produced by a Y-connection of the coils.

From EP 0 402 240 A1, an inclined cylinder rolling bearing with an integrated motor is known. The rotor is connected to the inner ring and the stator is connected to the outer ring. This motor requires a large amount of axial packaging space.

From DE 25 05 802 A1, a rotational speed encoder integrated in a rolling bearing is known. The electrical induction rotational speed encoder comprises an annular rotor body that has a C-shaped cross section and is made from ferromagnetic material. This carries a multi-pole permanent magnet. In the open space in the rotor body there is an annular stator body with a coil body with a coil winding. The stator body also carries an annular toothed disk made from ferromagnetic material, wherein the teeth of the toothed disk are arranged opposite the permanent magnet of the rotor. The rotor and stator interact such that, for the relative rotation of the bearing rings in the coil, an electrical pulse sequence or alternating voltage corresponding to the rotational speed is induced that can be used in a circuit arrangement for determining and/or controlling the rotational speed of the shaft.

From JP 2008 174 067 A, a radial bearing with a sensor is known that reliably detects a load moment on the wheel. The sensor is so compact that it can be integrated into the bearing. Within the bearing there is a magnetic circuit whose air gap is changed by a load or force onto the wheel. This change in the magnetic flux is detected and evaluated.

From U.S. Pat. No. 7,362,023 B2, a rolling bearing is known that is equipped with an electric generator, a rotational speed sensor, and a wireless transmitting unit. The electrical generator is constructed like a claw pole generator. A multi-pole magnet is here arranged as a rotor on the inner or outer ring and carries a plurality of alternately polarized magnets distributed on its periphery. A magnetic ring that carries a coil in its interior is arranged as a stator opposite the permanent magnet multi-pole ring. The magnetic ring carries claws that mesh one in the other and extend from the side walls of the magnetic ring past the coil. The rotational speed sensor and the wireless transmitting unit are supplied by the generator. Rotational speed data is transmitted to the peripherals with the wireless transmitting unit.

DE 102010021160 A, which is a published application of one of the inventors and assigned to the assignee of the present invention discloses a claw pole generator integrated into a rolling bearing, and FIGS. 1 and 2 of this publication are reproduced as FIGS. 4 and 5 of the present application as "Related Art." In FIGS. 4 and 5, a rolling bearing having an inner ring 101 and an outer ring 102 with rolling elements 103 located therebetween is shown. First and second claw pole generators 104, 105 are integrated into the rolling bearing between the inner and outer rings 101, 102. The claw pole generator includes a primary part 107 that is connected to one of the inner and outer bearing rings 101, 102, and in the illustrated embodiment, it is connected to the outer ring 102. Permanent magnets 108 are connected to the other of the inner ring and the outer ring 101, 102, opposite from the primary part 107 and form the secondary part 106. Here the permanent magnets are located on the inner ring 101. The magnets 108 are arranged spaced apart in the circumferential direction with alternating polarities, as shown. The primary part 107 includes a coil support/carrier 109 in which the coil 111 is located. Claw rings 112, 113 are arranged on opposite axial sides of the coil 111 on the support 109, and extend primarily in the radial direction. The claw rings 112, 113 have oppositely directed, axially extending, interdigitated claws 112a, 113a located in proximity to the permanent magnets 108. As the inner ring 101 is rotated relative to the outer ring 102, the alternating magnetic fields of the permanent magnets passing the opposite interdigitated claws 112a, 113a of the claw rings 112, 113 induce a current flow in the coil 111.

SUMMARY

The invention is based on the task of disclosing a rolling bearing with an improved and integrated capacity that can be produced economically for evaluating the operating states and a method for the operational management of such a rolling bearing.

The solution of the task is achieved by a rolling bearing and by a method with one or more of the features of the invention.

A rolling bearing according to the invention comprises two bearing rings that can rotate relative to each other and a first permanently excited generator whose primary part and secondary part are each locked in rotation with one of the bearing rings.

According to the invention, the rolling bearing comprises a second generator that works independently of the first generator. The first generator is loaded electrically and is used for supplying energy to sensors and/or actuators that are integrated in the bearing, while the second generator is unloaded electrically and delivers a voltage signal for determining the position and detecting the rotational speed.

A method according to the invention for the energy management of a rolling bearing according to the invention is characterized in that a first generator voltage generated in the first generator is subjected to voltage shaping, rectification, voltage smoothing, voltage stabilization, and current limiting and then charging electronics are powered for charging an energy storage device that powers, in turn, an electrical consumer.

The advantages of the invention are to be seen especially in that, within the rolling bearing, the sensors/actuators are incorporated by a first generator integrated in the bearing. A second generator advantageously with an identical structure supplies signals from which the position and speed of the moving bearing part and optionally other operating parameters can be determined.

The previously frequently used magnetoresistive or optical sensors for detecting the rotational speed and rotational direction each with a separate power supply can be eliminated. The generators can be produced economically in mass production and can also be integrated at a later time in rolling bearings of all possible constructions. A series application is possible in all bearing positions that require a monitoring or detection of operating parameters.

Different constructions can be used as the generators. Advantageously, permanently excited generators of the same construction are used in which a secondary part has permanent magnets that are arranged at least in some sections with alternating polarity on the periphery of one of the bearing rings. These can be, for example, claw pole generators, salient pole generators, disk-shaped rotor generators, rolling body generators, or the like.

For determining the absolute position of the rotating bearing part, in a preferred embodiment of the invention, the secondary part has a non-uniform magnetic field strength distributed around the periphery. This can be achieved in that, for example, the permanent magnets in the secondary part of the second generator are distributed non-symmetrically across the periphery. The permanent magnets have a different magnetic field strength. The resulting fluctuation in the generated voltage signal allows the determination of a position in the sense of an absolute value encoder.

For detecting the air gap changes due to a displacement and/or loading of the rolling bearing, the voltage signal of the second generator can be used. Likewise it is possible to arrange a Hall sensor at a position between the claws, wherein the signal from this sensor is evaluated. It is also possible to provide one of the claws with a coil enclosing this claw, wherein the induction signal of this coil can be evaluated.

The claws or salient poles of the two generators are arranged in a preferred embodiment offset relative to each other in the rolling bearing so that a phase shift of the two generator voltages by 90° relative to each other is achieved. This then corresponds essentially to a magnetoresistive measurement system with two tracks. The resulting approximately sine-shaped or cosine-shaped voltages allow a very exact determination of the angle by means of an arctan interpolation. By linearizing through sampling points, the arctan function is approximated. Here, an essentially sawtooth-shaped signal with the period length of a pole pitch is produced in the sense of an incremental encoder. Within one period, the arctan interpolation gives absolute position values. This guarantees a small amount of source code scope with good execution speed for the control software.

It is also conceivable to use generators with different pole numbers in order to evaluate the signals. Then the difference of the phases increases linearly with the absolute position. The principle of two tracks with different pole numbers is known from magnetoresistive sensors.

The energy management of the rolling bearing according to the invention comprises a voltage shaping to a nominal value that is achieved at a nominal rotational speed of the rolling bearing. At lower rotational speeds, the voltage increases. At higher rotational speeds, the voltage decreases. Then the voltage is rectified, smoothed, and stabilized. For powering charging electronics for an energy storage device, current limiting is required in advance. The energy storage device then powers the electrical consumer in the rolling bearing. This includes evaluation electronics for determining the rotational speed and rotational angle and optionally other sensors and/or actuators integrated in the bearing.

BRIEF DESCRIPTION OF THE DRAWINGS

A preferred embodiment of the invention will be explained below with reference to the figures. Shown are.

DETAILED DESCRIPTION OF THE PREFERRED EMBODIMENTS

Figure 1:
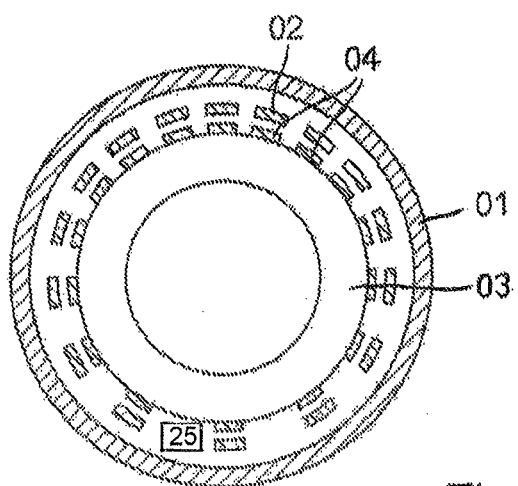
FIG. 1 is a schematic diagram of a rolling bearing with a claw pole generator with permanent magnets distributed in a non-symmetric arrangement.
Figure 4:
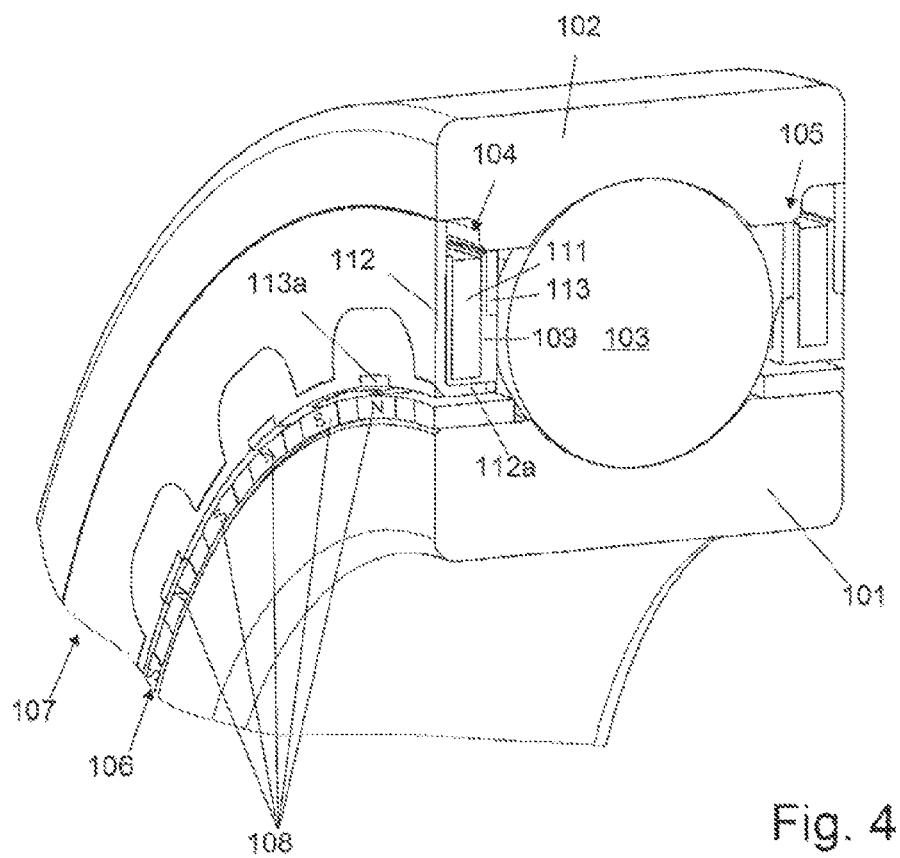
FIG. 4 is a partial perspective view of a claw pole generator integrated into a rolling bearing according to the related art.
Figure 5:
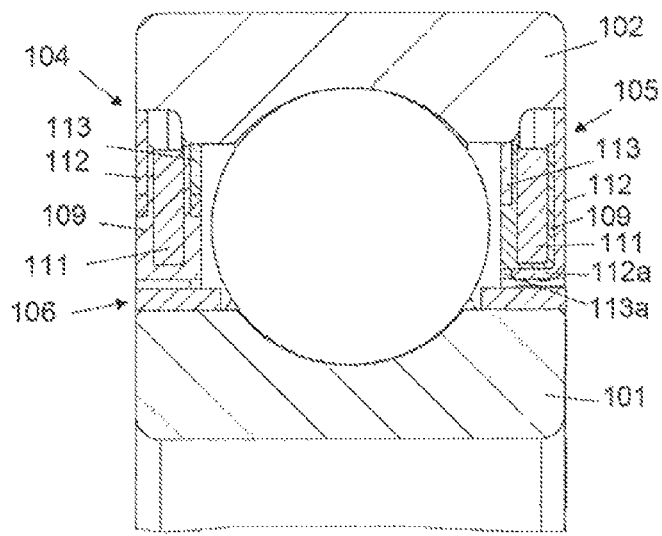
FIG. 5 is a cross-sectional view through the claw pole generator integrated into the rolling bearing as shown in FIG. 4.

In FIG. 1, a schematic diagram of a claw pole generator is shown that is integrated in a not-shown rolling bearing. The claw pole generator comprises a coil 01, similar to the coil 111 above, that is locked in rotation with an outer ring (102 in FIGS. 4 and 5) and also claws 02 (similar to claws 112a, 113a in FIGS. 4 and 5) that are arranged on a claw ring (similar to claw rings 112, 113 in FIGS. 4 and 5) and alternately cover the coil 01 on its side facing the inner ring (101 in FIGS. 4 and 5).

In this case, the inner ring 03 forms the rotor (secondary part) and the coil with the claw ring forms the stator (primary part).

Permanent magnets 04 (similar to the magnets 108 in FIGS. 4 and 5) with alternating polarity are arranged on the inner ring 03. Both the claws 02 and also the permanent magnets 04 are arranged with different distances relative to each other distributed on the periphery. This makes it possible to detect the absolute position of the rotating bearing part. Determining the rotational speed is also possible with this arrangement from the voltage signal of the generator.

Figure 2:
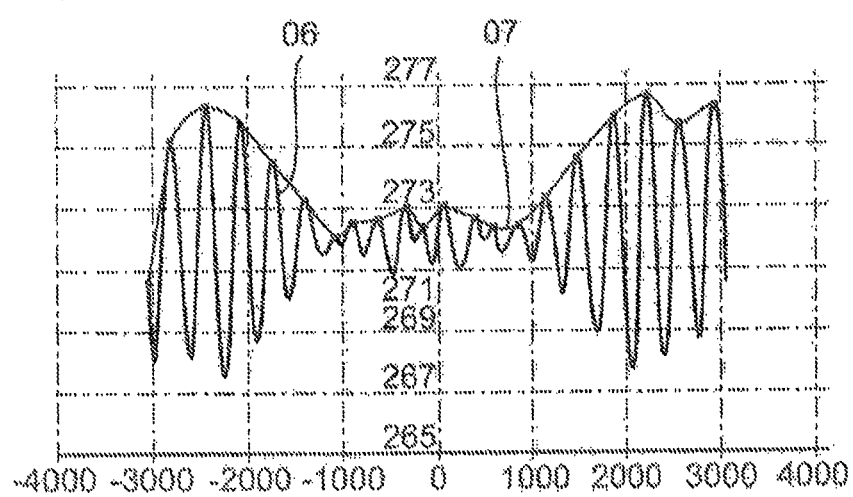
FIG. 2 is a voltage profile of a generator voltage, as generated with the claw pole generator shown in FIG. 1.

In FIG. 2, a possible voltage profile 06 of a second generator voltage as a signal of an absolute value encoder is shown. An envelope curve 07 of the voltage profile 06 is evaluated in a way that is known to someone skilled in the art and delivers, as a result, the rotational speed and optionally rotational angle.

Figure 3:
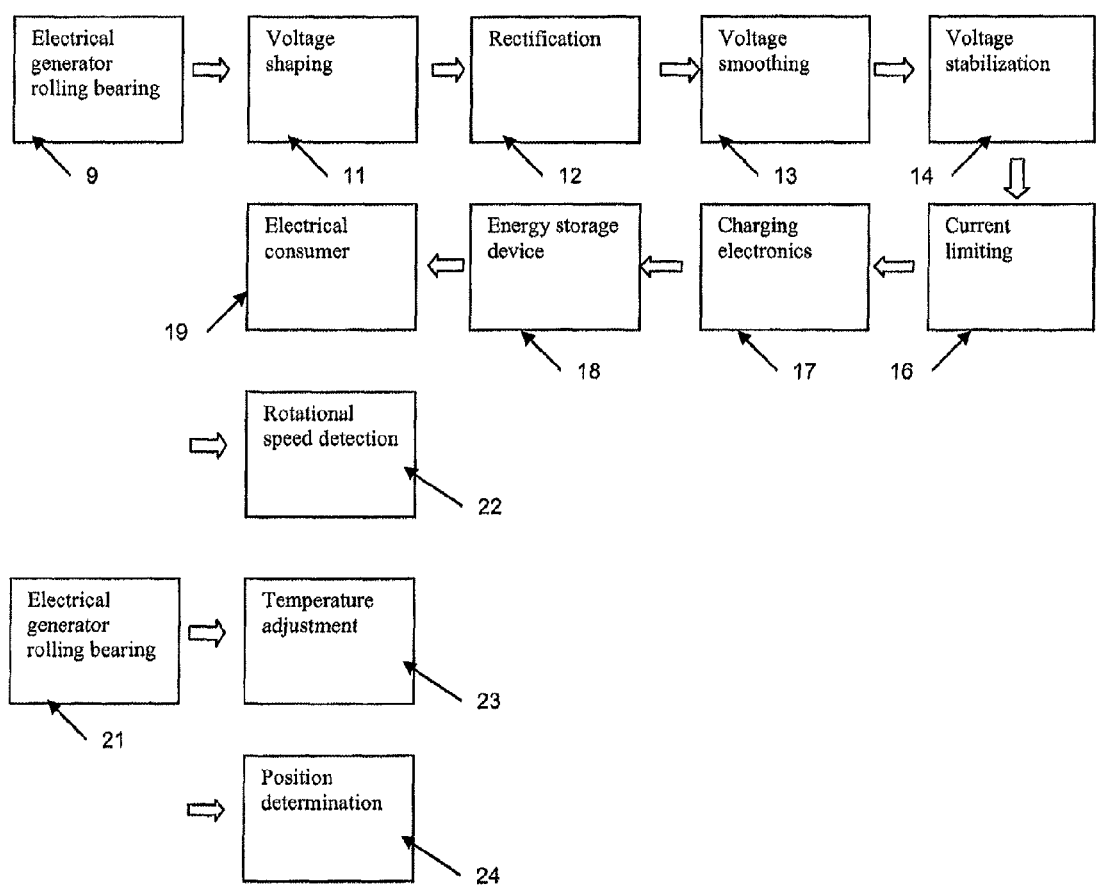
FIG. 3 is a system model of an energy management method.

In FIG. 3, a preferred embodiment of a method for the energy management of a rolling bearing equipped with two generators is shown. The sequence of processing steps described below is made clear by the arrows drawn in the figure.

A first generator 09 can have different embodiments, for example, a claw pole generator, a salient pole generator, or a rolling body generator could be used here. Obviously other generator constructions could also be used as long as they can be integrated into a rolling bearing.

A first generator voltage generated during the operation of the rolling bearing is subjected first to voltage shaping 11. This can be realized by means of a step-up converter with a transformer, a charge pump, a Villard circuit, or a Delon circuit.

A subsequent step of rectification 12 can be performed by means of known circuits, such as, for example, a one-pulse, two-pulse, or three-pulse center point circuit or two-pulse or six-pulse bridge circuit.

Voltage smoothing 13 is performed advantageously by means of a charging capacitor, an RC filter element, or an LC filter element. Voltage stabilization 14 can be performed by means of parallel stabilization (Z-diode and transverse transistor or operational amplifier) or series stabilization (Z-diode with longitudinal transistor, control amplifier, and ripple compensation or Z-diode with operational amplifier).

Current limiting 16 is realized by means of an overcurrent fuse, a current limiting resistor, current regulation, or current feedback.

Charging electronics 17 comprises the generation of an end-of-charge voltage, limiting the charging current, detecting the charging cycle, detecting the temperature, and determining the state of charge of an energy storage device 18 that can be constructed, for example, as a super capacitor, secondary cell, or primary cell.

The energy storage device 18 powers an electrical consumer 19 that is formed by other sensors and/or actuators, indicated schematically at 25 in FIG. 1, arranged on its periphery.

A second generator 21 is used for detecting the rotational speed 22, detecting the temperature 23, and optionally determining the position 24, each on the rolling bearing.

Detecting the rotational speed 22 can be performed by the counting of physical reference marks, in which a time signal is derived by an interpolation algorithm. Thus an absolute and relative detection of the position is also possible.

For determining an absolute position, a Hall sensor can be used that generates the reference marks. The Hall sensor is then arranged between the claws, such as illustrated schematically at 25 in FIG. 1.

Another possibility for detecting the position consists in providing a coil that surrounds one of the claws 02. The induction signal of this coil can also be used for determining the absolute position.

From the rotational angle, in a known way the angular velocity can be determined through differentiation and the angular acceleration can be determined through differentiation again. Advantageously, however, the reference marks for determining the rotational speed are obtained from the voltage signal of the second generator 21 by determining extreme values. The rotational speed is reproduced through the frequency of the voltage signal.

Detecting the temperature 23 is performed advantageously by current measurement and voltage measurement on the second generator 21. From this, the total resistance is determined and the temperature in the bearing can be determined through the known load resistance and temperature-dependent winding resistance of the coil.

Furthermore, a signal evaluation could be performed in an evaluation unit by means of the voltage signal of the second generator with respect to a change in the air gap or an operating hour counter could be realized.

LIST OF REFERENCE NUMBERS

01 Coil
02 Claw
03 Inner ring
04 Permanent magnet
05 -
06 Voltage signal
07 Envelope curve
08 -
09 First generator
10 -
11 Voltage shaping
12 Rectification
13 Voltage smoothing
14 Voltage stabilization
15 -
16 Current limiting
17 Charging electronics
18 Energy storage device
19 Consumer
20 -
21 Second generator
22 Rotational speed detection
23 Temperature detection
24 Position determination
25 Sensor/Actuator between the claws
101 Inner Ring
102 Outer Ring
103 Rolling body
104 First claw pole generator
105 Second claw pole generator
106 Secondary part
107 Primary Part
108 Permanent magnets
109 Coil support/carrier
111 Coil
112 Claw ring
112a Claw
113 Claw ring
113a Claw

The invention claimed is:
1. Rolling bearing comprising a permanently excited first generator that is arranged in an intermediate space between two bearing rings that can rotate relative to each other and that comprises a primary part and a secondary part and that generates a first generator voltage during operation, the secondary part has permanent magnets that are arranged at least in some sections with alternating polarity on a periphery of one of the bearing rings, a second generator arranged between the two bearing rings, the first generator voltage is used for supplying energy to at least one of sensors or actuators integrated in the bearing, while the second generator delivers a voltage signal for determining a position and for detecting a rotational speed, the second generator has the same construction as the first generator, the generators are claw pole generators, the second generator operates independently of the first generator, and the second generator is unloaded electrically.

2. Rolling bearing according to claim 1, wherein for determining an absolute position of the rolling bearing, the secondary part has a non-uniform magnetic field strength distributed around a periphery or a Hall sensor is arranged between the claws or a coil surrounding the claws is provided.

3. Rolling bearing according to claim 2, wherein one or more of the permanent magnets have different magnetic field strengths.

4. Rolling bearing according to claim 2, wherein the permanent magnets are arranged at different distances from each other.

* * * * *